Dec. 1, 1931.   M. J. CAFIERO   1,834,142
CABLE SUPPORT
Filed Jan. 25, 1928
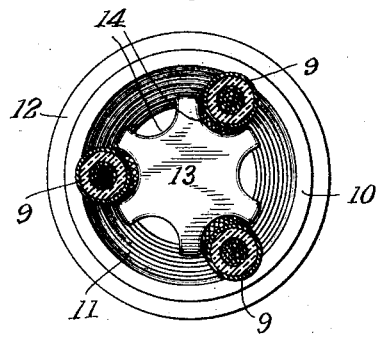
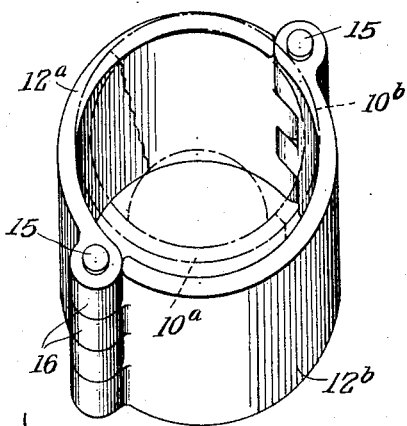
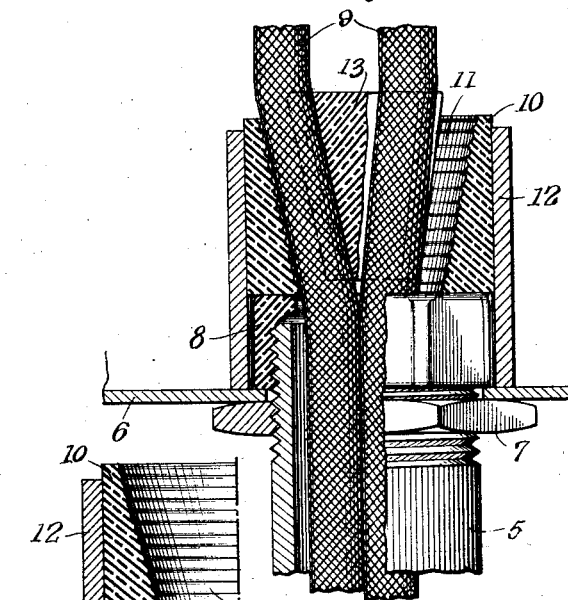
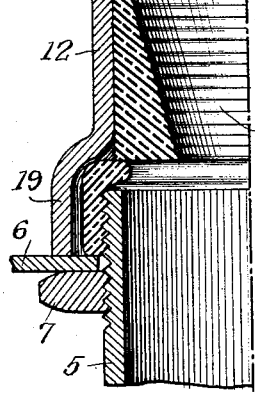
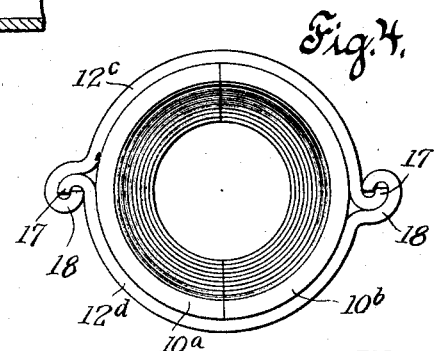
INVENTOR.
Michael J. Cafiero
BY
Philip S. McLean. ATTORNEY Patented Dec. 1, 1931

1,834,142

UNITED STATES PATENT OFFICE

MICHAEL J. CAFIERO, OF BROOKLYN, NEW YORK

CABLE SUPPORT

Application filed January 25, 1928. Serial No. 249,408.

The objects of this invention are to provide a holder for supporting vertical cables which can be readily applied to existing conduit and box structures, which will be strong and fully capable of sustaining the weight of the cables, which will be small and compact for its strength and sustaining power and which will be relatively simple in its structure and inexpensive to manufacture.

The drawings accompanying and forming part of this specification illustrate practical embodiments of the invention, wherein the above and other desirable objects are attained, but it should be understood that the form of the structure may be varied as to this illustration without departure from the true spirit and broad scope of the invention.

Figure 1 is a plan view of the holder shown in use supporting three cables, the cables appearing in section.

Figure 2 is a broken vertical sectional view of the holder as applied to the conduit and box structure.

Figure 3 is a perspective view illustrating a modification in which the holder is built in parts so as to be engageable about cables which have already been installed.

Figure 4 is a part sectional view showing another form of two part casing.

Figure 5 is a sectional view illustrating the casing enlarged at the lower end to fit over a large size bushing.

In Figure 2 the upper end of a vertical conduit is indicated at 5 extending through a box wall 6 and secured thereto by lock nut 7 and screw bushing 8.

The cables 9 are suspended from the box and the head of the conduit by an insulating support 10 shown as of externally cylindrical shape and as having a downwardly tapering corrugated inner wall 11, said insulating support being illustrated as resting on the bushing 8 on the end of the pipe and as surrounded by a cylindrical sleeve or shell 12 resting on the box wall 6. The cables are forced into gripped engagement with the inner conical wall of the support by a correspondingly tapered wedge 13 grooved in its sides at 14 to fit the cable or cables.

The inclined cable gripping and supporting member 10 is braced and reinforced by the surrounding sleeve 12 and may have such a fit in said shell that it may, if necessary, slip down in the shell sufficiently to rest on top of the pipe bushing 8, when the shell is resting on the box wall. This construction enables the weight of the cables to be carried partly by the box and partly by the conduit system, the load being divided between the insulating support resting on the conduit bushing and the enclosing shell resting on the box.

The conduit bushing 8 is shown as made of insulating material such as reinforced phenolic condensation product or other suitable insulating material having the requisite strength and durability. This bushing therefore provides an insulating base for the insulating cable support, preventing any possible grounding of the cables on the end of the conduit and being enclosed by the lower end of the sleeve 12, it is reinforced against breakage or injury and made fully capable of sustaining the cable supporting member 10.

If desired, the supporting member and its enclosing casing may be made in parts which can be assembled about existing or previously installed cable equipment. Thus, as shown in Figure 3, the insulating supporting member may be made in longitudinally separable companion parts 10a and 10b and the casing or sleeve in companion parts 12a, 12b, the latter parts being suitably secured together as by pins or pintles 15 passed through the perforated matching lugs 16 on the ends of such parts.

The latter form of the device is mounted by simply placing the halves or sections of the insulating support about the cable, over the end or top of the conduit bushing and then securing the halves or sections of the casing together in position surrounding the support and bushing, after which the wedge is seated in the support over the cable or cables.

Figure 4 shows how the sections 12c, 12d, of the two part casing may be joined by the provision of hooks or lugs 17 on one end of each section and sockets 18 to receive said lugs on the other ends of the sections. These parts may be interlocked by endwise movement.

For larger size conduits or where the bushing on the end of the conduit is of rather large diameter, the casing 12 may be enlarged at the lower end so as to pass freely over the bushing. Thus the insulating support 10 and wedge 13 may be of one size for several different sizes of conduit and the casing be simply made large enough at the lower end as at 19 to fit over the different sizes of conduit. When only a single cable is to be supported the insulating supporting member and cooperating wedge element may be made as shown in Figure 4 of the Cafiero Patent No. 1,576,947; that is, with the support occupying one half or portion of the casing and the wedge sliding in the other half or portion of the casing in position to clamp the cable against the inclined gripping surface of the cable supporting member.

What is claimed is:

1. A vertical cable support comprising an insulating supporting member in vertically separable sections having inwardly and downwardly inclined cable gripping and support and bushing, after which the wedge for cooperative relation with said surfaces and a casing in vertically separable sections surrounding the separable sections of the supporting member and having a skirt portion extending below said separable sections of the insulating support.

2. In a vertical cable support, the combination with a cable conduit, a bushing of insulating material applied to the upper end of said conduit, a tubular support of insulating material resting on said insulating bushing and having a downwardly and inwardly inclined cable gripping and supporting surface, a confining and reinforcing casing surrounding said cable supporting member and extending down over and around said insulating bushing and a cable holding wedge within the tubular supporting member and opposed to the cable supporting surface.

3. A vertical cable support comprising a vertically divided sectional casing, the sections of said casing having interlocking elements at the ends of the same for securing said casing about a cable supporting member and a tubular insulating cable supporting member in said casing, said supporting member consisting of vertically divided sections having downwardly and inwardly inclined cable supporting surfaces and a wedge element cooperating with said cable supporting surfaces.

4. A vertical cable support comprising a tubular insulating cable supporting member in sections, which can be placed in surrounding relation about a vertically extending cable or cables, a casing for said sectional insulating support, said casing also being sectional and thereby engageable about existing vertical cables, interlocking hook elements at the ends of said casing sections and whereby said casing sections are locked together as a complete casing surrounding the sectional tubular insulating support and the cable or cables surrounded thereby, said sectional support having a downwardly and inwardly inclined cable supporting surface, a wedge element for cooperating with said cable supporting surface, a horizontal supporting shoulder for the sectional insulating support, said supporting shoulder consisting of a conduit bushing adapted to be applied to the upper end of a vertical conduit and the sectional casing receiving said conduit bushing in the lower end of the same to thereby locate the supporting shoulder for the sectional insulating cable support within the confines of said sectional casing.

5. A vertical cable support comprising a tubular insulating cable supporting member in vertically separable sections which can be placed in surrounding relation about a vertically extending cable, a casing for said sectional insulating support, said casing also consisting of vertically separable sections engageable about existing vertical cables, interlocking hook elements on the ends of said casing sections and whereby said casing sections may be locked together as a complete casing surrounding the sectional tubular insulating support, said sectional support having a downwardly and inwardly inclined cable supporting surface, a wedge element for cooperating with said cable supporting surface and a horizontal support for the sections of the insulating support confined in said sectional casing.

6. In a vertical cable support, the combination with a vertical cable conduit, a bushing one the upper end of said conduit, a tubular support of insulating material resting on and supported by said bushing and having downwardly and inwardly inclined cable gripping and supporting surface, a cable holding wedge within said supporting member and opposed to said inclined cable supporting surface and a confining and reinforcing casing surrounding the cable supporting member and extending down over and around the bushing on the upper end of the conduit.

In testimony whereof I affix my signature.

MICHAEL J. CAFIERO.